US008656021B2

(12) United States Patent  (10) Patent No.: US 8,656,021 B2
Kai  (45) Date of Patent: Feb. 18, 2014

(54) METHODS AND APPARATUS FOR CONSTRUCTING AN EXECUTION ENVIRONMENT IN WHICH THE APPLICATION OPERATES

(75) Inventor: Ryuichiro Kai, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 483 days.

(21) Appl. No.: 12/714,897

(22) Filed: Mar. 1, 2010

(65) Prior Publication Data

US 2010/0235511 A1  Sep. 16, 2010

(30) Foreign Application Priority Data

Mar. 13, 2009 (JP) ................................. 2009-061905

(51) Int. Cl.
*G06F 15/173* (2006.01)
(52) U.S. Cl.
USPC ........... 709/226; 709/203; 709/219; 718/104; 719/310
(58) Field of Classification Search
USPC .................. 709/203, 219, 226, 224; 719/310; 718/104
See application file for complete search history.

(56) References Cited

U.S. PATENT DOCUMENTS

| | | | | |
|---|---|---|---|---|
| 5,901,312 A * | 5/1999 | Radko | | 718/104 |
| 6,457,042 B1 * | 9/2002 | Czaykowski et al. | | 709/203 |
| 7,257,816 B2 * | 8/2007 | Kulp et al. | | 709/226 |
| 7,765,552 B2 * | 7/2010 | Miller et al. | | 709/226 |
| 7,827,557 B2 * | 11/2010 | Zhu et al. | | 709/224 |
| 7,917,626 B2 * | 3/2011 | Krishnan et al. | | 709/226 |
| 2003/0101265 A1 * | 5/2003 | Dantzig et al. | | 709/226 |
| 2003/0163802 A1 * | 8/2003 | Takahashi | | 717/136 |
| 2004/0210646 A1 | 10/2004 | Sushima et al. | | |
| 2005/0015625 A1 * | 1/2005 | Inoue et al. | | 713/201 |
| 2005/0039183 A1 * | 2/2005 | Romero et al. | | 718/100 |
| 2005/0228850 A1 * | 10/2005 | Zhu et al. | | 709/200 |
| 2005/0234937 A1 | 10/2005 | Ernest et al. | | |
| 2006/0005181 A1 | 1/2006 | Fellenstein et al. | | |
| 2006/0064698 A1 * | 3/2006 | Miller et al. | | 718/104 |
| 2006/0112400 A1 * | 5/2006 | Zhang et al. | | 719/328 |
| 2006/0123115 A1 * | 6/2006 | Satomi | | 709/226 |

FOREIGN PATENT DOCUMENTS

| | | |
|---|---|---|
| CN | 1954289 | 4/2007 |
| JP | H 04-175924 A | 6/1992 |
| JP | 2521020 B2 | 5/1996 |
| JP | 2001-195270 A1 | 7/2001 |
| JP | 2004-503011 A | 1/2004 |
| JP | 2004-318578 A | 11/2004 |
| JP | 2006-163482 A | 6/2006 |
| JP | 2006163482 A * | 6/2006 |
| WO | WO 02/03220 A2 | 1/2002 |
| WO | WO 2005-124539 A1 | 12/2005 |

OTHER PUBLICATIONS

Sakaniwa, Japan Patent Office, Translation of "Notice of Reasons for Rejection" for Japanese Application No. 2009-061905, Sep. 2013, Translation by: FLS Inc.*

(Continued)

*Primary Examiner* — Ramy M Osman
(74) *Attorney, Agent, or Firm* — Arent Fox LLP

(57) ABSTRACT

The problem is solved by including a read unit reading operation information corresponding to an application according to an execution request and relating to an operation of the application; and a construction unit constructing an execution environment in which the application operates, based on the operation information read by the read unit.

8 Claims, 12 Drawing Sheets

(56) References Cited

OTHER PUBLICATIONS

Kai et al., "Web System Architecture Design that Considers Performance, Expandability and Availability", May 2005, Nikkei Internet Technology, Translation by: The McElroy Translation Company, pp. 104-111.*

Office Action issued on Jan. 29, 2013, in counterpart Japanese Patent Application No. 2009-061905 (5 pages including partial English translation).

Kai, Ryuichiro, et al., "Architecture design of Web system in consideration of performance, extensibility, and availability," Web system construction method learning from case example, 2nd, Nikkei Internet Technology, Japan, Nikkei Business Publications, Inc. Issue No. 58, pp. 104-111.

Japanese Office Action issued Oct. 8, 2013, in counterpart Japanese Patent Application No.2009-061905 (4 pages).

Kai, Ryuichiro, et al., "Architecture design of Web system in consideration of performance, extensibility, and availability, " Web system construction method learning from case example, 2nd, Nikkei Internet Technology, Japan, Nikkei Business Publications, Inc. Issue No. 58, pp. 104-111,.

\* cited by examiner

FIG.6

1. KIND OF CPU
2. KIND OF OS
3. CODE FORM, MIDDLEWARE, KIND OF INTERPRETER
4. REQUIRED RESOURCES (NUMBER OF CPUS, MEMORY SIZE, STORAGE SIZE)
5. PRESENCE/ABSENCE OF SPECIFIC RESOURCE AND IDENTIFICATION OF REGION THEREFOR (DEDICATED REGION)
6. SLA REGION (SECURED OPERATING TIME, DATE AND HOUR, AND SO ON)
7. ASSOCIATED TAG

FIG.7

APPLICATION A

| | |
|---|---|
| 1 | IA-86 |
| 2 | LINUX, VER X, PATCH XX |
| 3 | WEBLOGIC, VER X, PATCH XX |
| 4 | 4、2GB、5GB |
| 5 | ABSENCE |
| 6 | 24 HOURS 365 DAYS |
| 7 | TAG C |

FIG.8

APPLICATION B

| 1 | IA-86 |
|---|---|
| 2 | LINUX, VER X, PATCH XX |
| 3 | WEBLOGIC, VER X, PATCH XX |
| 4 | 10、4GB、5GB |
| 5 | ABSENCE |
| 6 | 22 O'CLOCK AT END OF EVERY MONTH |
| 7 | TAG C |

FIG.9

APPLICATION C

| 1 | IA-86 |
|---|---|
| 2 | LINUX, VER X, PATCH XX |
| 3 | Oracle、PSR XX |
| 4 | 2、2GB、0GB |
| 5 | PRESENCE, LUN, APP ATTENDANCE |
| 6 | 24 HOURS 365 DAYS |
| 7 | TAG A |
| 1 | IA-86 |
| 2 | LINUX, VER X, PATCH XX |
| 3 | Oracle、PSR XX |
| 4 | 16、4GB、5GB |
| 5 | PRESENCE, LUN, APP ATTENDANCE |
| 6 | 22 O'CLOCK AT END OF EVERY MONTH |
| 7 | TAG B |

FIG.13

| USER IDENTIFIER | AVAILABLE APPLICATION | SELECTABLE PROCESSING PERFORMANCE |
|---|---|---|
| USER 001 | APP-x | PROCESSING PERFORMANCE a (RESPONSE TIME WITHIN 1 ms) |
| USER 001 | APP-x | PROCESSING PERFORMANCE b (RESPONSE TIME WITHIN 1 s) |
| USER 001 | APP-y | - |
| USER 002 | APP-z | - |

FIG.14A

TAG INFORMATION 1 OF APP-x

| 1 | RESPONSE TIME WITHIN 0.5 ms |
|---|---|
| 2 | CPU-1 |
| 3 | OS-1 |
| 4 | DB-1 |
| 5 | 1000 YEN/HOUR |

FIG.14B

TAG INFORMATION 2 OF APP-x

| 1 | RESPONSE TIME WITHIN 0.5 s |
|---|---|
| 2 | CPU-2 |
| 3 | OS-2 |
| 4 | DB-2 |
| 5 | 10 YEN/HOUR |

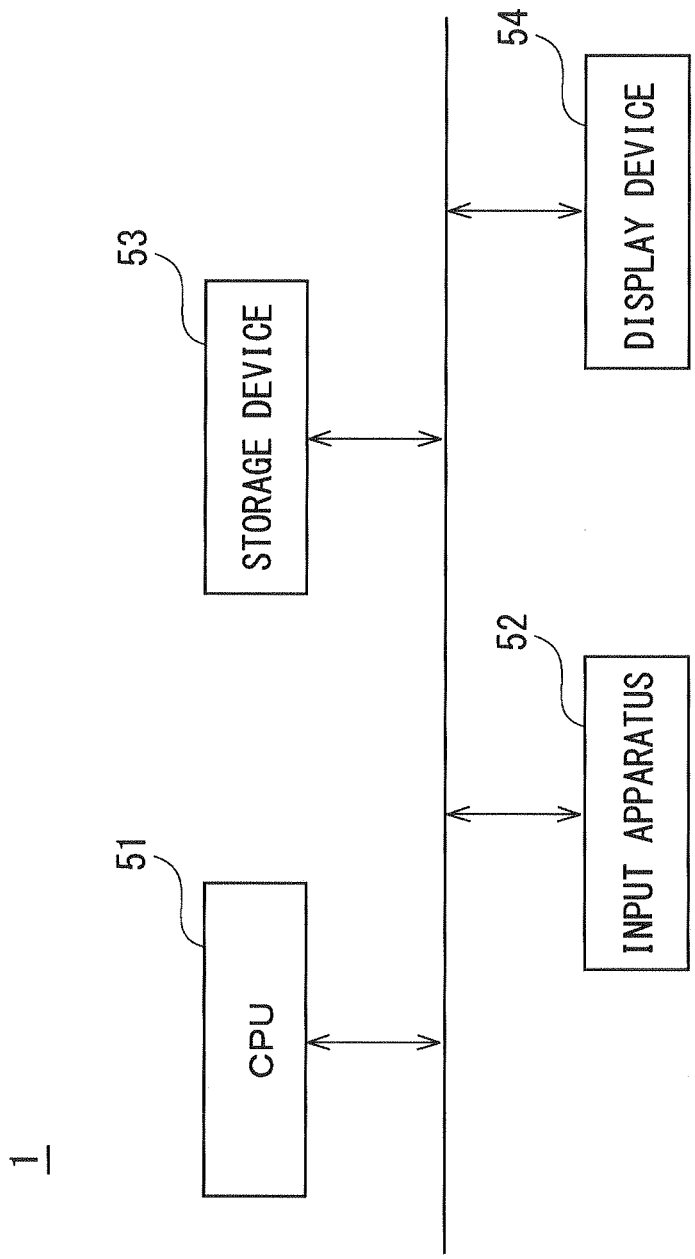

METHODS AND APPARATUS FOR CONSTRUCTING AN EXECUTION ENVIRONMENT IN WHICH THE APPLICATION OPERATES

CROSS-REFERENCE TO RELATED APPLICATIONS

This application is based upon and claims the benefit of priority of the prior Japanese Patent Application No. 2009-061905, filed on Mar. 13, 2009, the entire contents of which are incorporated herein by reference.

BACKGROUND OF THE INVENTION

1. Field of the Invention

The present invention relates to an information processing apparatus, an information processing method, and a program product.

2. Description of the Related Art

In recent years, for effective utilization of system infrastructure resources, utility computing and cloud computing of the system infrastructure are in progress. As a result, unlike a conventional system in which an application (hereinafter, referred to as an APP) is executed in a specific system infrastructure, there exists a system in which the environment in which an APP is executed cannot be uniquely identified as well as the place in which the APP is being executed is also different depending on the availability of the infrastructure.

On the other hand, the APP has become complicated, and construction and so on of a system are sometimes carried out without consideration of a use environment in which the APP is used. In other words, a join test or the like of the APP should be essentially conducted in the actual use environment, but setting of such a test environment is not easy and therefore a system is often constructed after only a unit test of the APP is conducted. Further, even in the case where an APP has been developed assuming that the APP is executed by 10 servers with a performance X, another server having a performance higher than the performance X may be developed and such servers are introduced at the time of execution of the APP, resulting in their resources left unused. Besides, with an improvement in performance of the server, the number of servers may be reduced to eight. In addition, it is unknown when the APP is allocated to which server because of the system infrastructure brought into the utility computing, and it is also unknown what kind of storage in which server data will be stored because of the system infrastructure brought into the cloud computing.

Patent Document 1: Japanese Patent No. 2521020

As described above, the APP may operate in an execution environment different from that at the development of the APP. In other words, a problem is that the quality relating to the operation of the APP when the execution environment for the APP is different from the development environment is not assured. For example, a problem is that the response time degrades and the service level of the system degrades in the execution environment.

SUMMARY OF THE INVENTION

The present invention has been made in consideration of the above problems, and an object thereof is to provide a technology assuring the operation quality of an APP and the quality relating to the service level containing the response time.

Hence, an information processing apparatus of the present invention includes: a read unit reading operation information corresponding to an application according to an execution request and relating to an operation of the application; and a construction unit constructing an execution environment in which the application operates, based on the operation information read by the read unit.

The information processing apparatus of the present invention includes a read unit reading operation information corresponding to an application according to an execution request and relating to an operation of the application and a construction unit constructing an execution environment in which the application operates, based on the operation information read by the read unit, whereby the information processing apparatus can cause an APP to operate in the constructed execution environment, for example, based on the operation information containing information of the execution environment of the APP and so on. Therefore, the information processing apparatus can provide a technology assuring the quality relating to the operation of an APP even when the execution environment of the APP is different from the development environment thereof.

Note that the information processing apparatus corresponds, for example, to a later-described server apparatus 2 or a client apparatus 1 or the like. To describe more concretely, when the present invention is applied to a system including the utility system as in a later-described first embodiment, the information processing apparatus corresponds to the later-described server apparatus 2. On the other hand, when the present invention is applied to a single PC as in a later-described fifth embodiment, the information processing apparatus corresponds, for example, to a later-described client apparatus (PC).

Further, the operation information corresponds, for example, to later-described Tag information.

Further, an information processing method of the present invention includes: a read step of an information processing apparatus reading operation information corresponding to an application according to an execution request and relating to an operation of the application; and a construction step of the information processing apparatus constructing an execution environment in which the application operates, based on the operation information read in the read step.

Further, a program product of the present invention causes a computer to function as: a read unit reading operation information corresponding to an application according to an execution request and relating to an operation of the application; and a construction unit constructing an execution environment in which the application operates, based on the operation information read by the read unit.

BRIEF DESCRIPTION OF THE DRAWINGS

FIG. 6 is a diagram illustrating an example of Tag information;

FIG. 7 is a diagram illustrating an example of the Tag information of an application A;

FIG. 8 is a diagram illustrating an example of the Tag information of an application B;

FIG. 9 is a diagram illustrating an example of the Tag information of an application C;

FIG. 13 is a diagram illustrating a table storing available APPs for each user and selectable processing performances;

FIGS. 14A and 14B are diagrams each illustrating the Tag information in which the performance information of the application and the operating environment are written in a corresponding manner; and FIG. 15 is a diagram illustrating an example of a hardware configuration of a client apparatus.

DETAILED DESCRIPTION OF THE PREFERRED EMBODIMENTS

Hereinafter, embodiments of the present invention will be described with reference to the drawings.

Note that the utility system in this specification refers to a system to/from which system resources such as a CPU, a storage device (a storage medium) and so on can be freely added/deleted. Further, the cloud system refers to a system providing service (or receiving service provision) using various resources dispersed on the Internet. In the cloud system, the user only needs to have a client computer (PC), and applications are provided from the other side (the cloud system side) of the Net and information is also managed by the other side (the cloud system side).

-First Embodiment-

Figure 1:
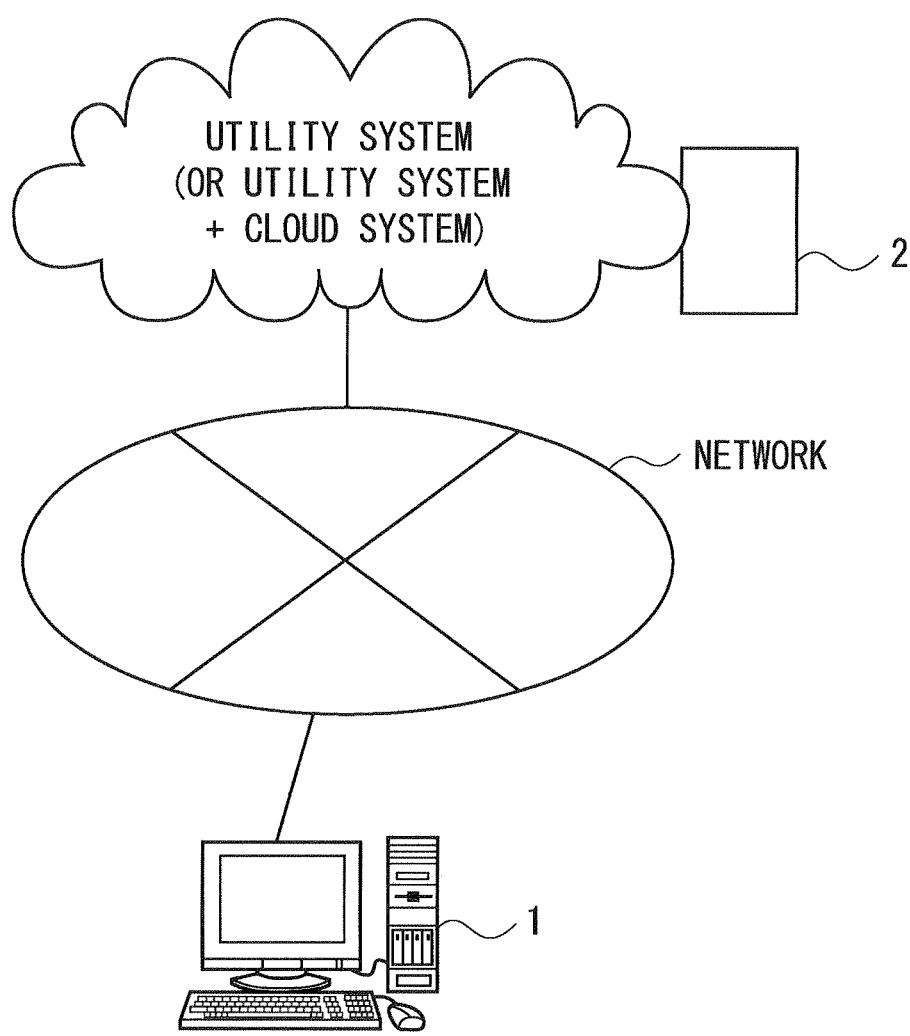
FIG. 1 is a diagram illustrating an example of a system configuration of a system described in this embodiment.

FIG. 1 is a diagram illustrating an example of a system configuration of a system described in this embodiment.

As illustrated in FIG. 1, a client apparatus 1 is communicably connected to the utility system (or the utility system and the cloud system and so on) via a network. Note that though there is one client apparatus 1 in FIG. 1 for simplifying the description, a plurality of client apparatuses may be connected to the network. Further, the client apparatus 1 shall be communicably connected to the utility system via the network in the embodiments illustrated below for simplifying the description.

The utility system includes and manages a plurality of physical sources (hardware and so on) as described later. Note that the control of the whole utility system shall be conducted by a server apparatus 2. Though there is sometimes a single server apparatus 2, a plurality of server apparatuses 2 may exist in the cloud system and conduct control while communicating with each other. Further, though several expressions such as the client apparatus, the server apparatus, and the utility system are used for the forms of hardware in this specification, these expressions are intended merely to aid understanding. Tentatively, the side requiring the use of an APP shall be described as the client apparatus, and the side providing the function of the APP shall be described as the server apparatus. An apparatus may physically serve both as the client apparatus and the server apparatus, or the apparatus may exist as one of the apparatuses constituting the utility system.

Figure 2:
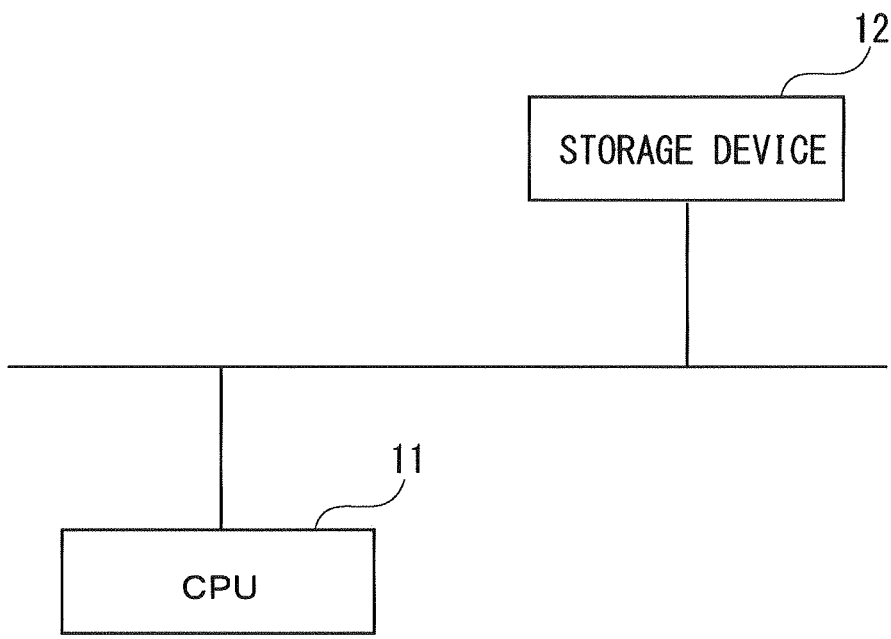
FIG. 2 is a diagram illustrating an example of a hardware configuration of a server apparatus.

FIG. 2 is a diagram illustrating an example of a hardware configuration of the server apparatus. As illustrated in FIG. 2, the server apparatus 2 includes a CPU 11 as the hardware configuration.

The CPU 11 performs processing based on programs (for example, an APP provisioning engine program) stored in a storage device 12, to thereby realize the function of the server apparatus 2 or processing relating to a later-described flowchart.

Further, to the CPU 11, the storage device 12 is connected via a bus. The storage device 12 composed of, for example, a ROM, a RAM, a hard disk device and so on and stores data used in the processing based on the programs in addition to the above-described programs.

Figure 3:
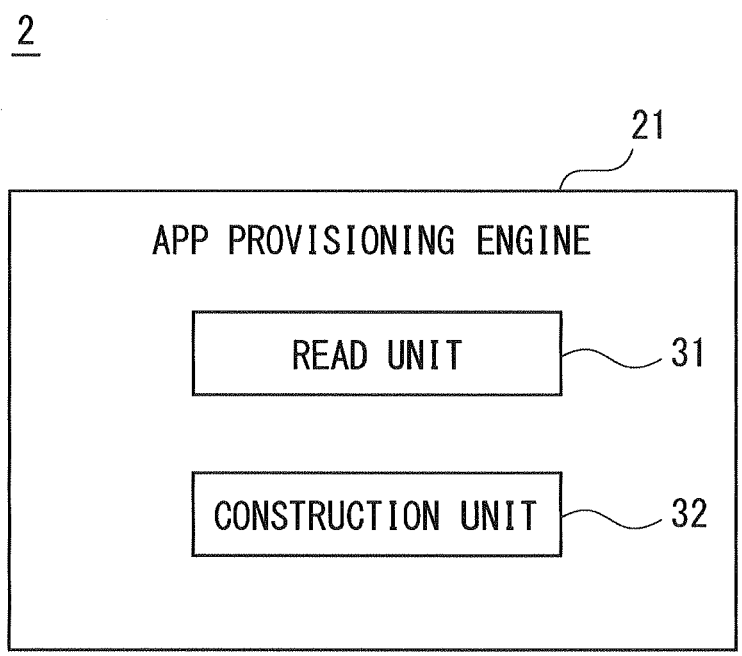
FIG. 3 is a diagram (I) illustrating an example of a functional configuration of the server apparatus.

FIG. 3 is a diagram (I) illustrating an example of a functional configuration of the server apparatus. As illustrated in FIG. 3, the server apparatus 2 includes, as the functional configuration, an APP provisioning engine 21 realized by the CPU 11 executing the programs.

The APP provisioning engine 21 further includes, as functions, a read unit 31 and a construction unit 32.

The read unit 31 reads Tag information corresponding to an APP that the client apparatus 1 or the like requests to execute. Note that the Tag information shall have been stored in a specific position of the APP in this embodiment.

The Tag information here includes, for example, information as follows.

APP identifier (unit operation or SOA module or library or the like)

Kind of object (machine language or interpreter use [OS dependent or independent]

For machine language, kind of CPU (IA-86 or Itanium or Sparc or IBM-P or the like)

Operating OS information (OS identifier and Ver identifier and patch identifier and so on)

Code format

Kind of interpreter

Operating Middleware information 1 (kind of DB and kind of APP execution environment and so on)

Operating Middleware information 2 (Ver identifier and patch identifier)

Service level information 1 (response time or availability time or the like)

Service level information 2 (CPU resource usage or memory usage or the like

Backup archive information

Associated Tag (another Tag associated with interested Tag)

Note that the Tag information does not need to include all of the above-descried kinds of information or may include only a part of the above-described kinds of information.

The construction unit 32 constructs an execution environment in which an APP operates, by combining fragmented virtualized resources based on the Tag information read by the read unit 31. Further, when the construction unit 32 could not construct the execution environment in which the APP operates, by combining fragmented virtualized resources based on the Tag information read by the read unit 31, the construction unit 32 outputs (or returns), for example, information or the like that the construction unit 32 cannot cause the APP to operate because it cannot construct the execution environment in which the APP can operate, to the client apparatus or the like that has requested execution of the APP.

Figure 4:
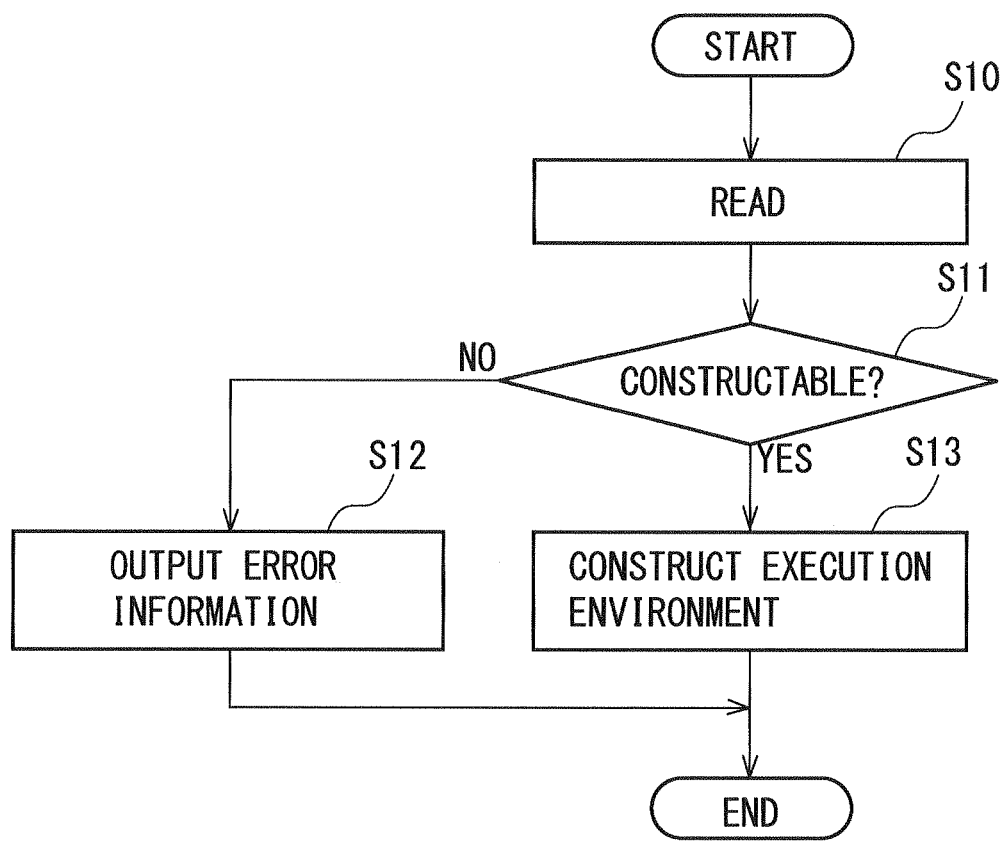
FIG. 4 is a flowchart (I) illustrating an example of processing of an APP provisioning engine.

FIG. 4 is a flowchart (I) illustrating an example of processing of the APP provisioning engine.

At Step S10, the read unit 31 reads the Tag information from the APP that the client apparatus 1 or the like has requested to execute.

Figure 5:
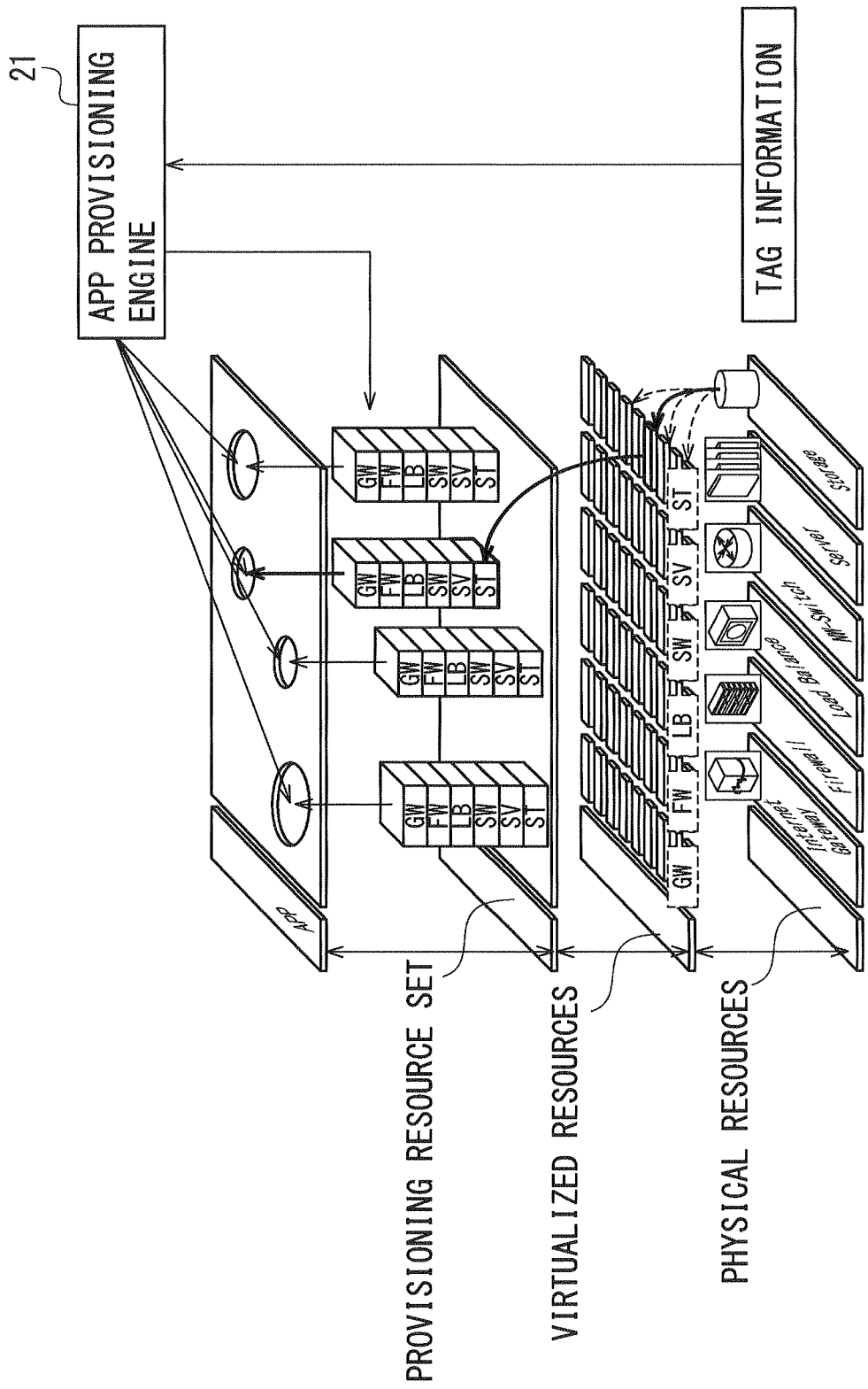
FIG. 5 is a diagram for explaining processing by the APP provisioning engine.

At Step S11, the construction unit 32 judges whether the execution environment in which the APP can operate (for example, a provisioning resource set illustrated in FIG. 5) can be constructed, based on the Tag information read by the read unit 31 at Step S10 and virtualized resources available at present (or available to the user of the client apparatus 1 which has requested execution) of the fragmented virtualized resources as illustrate in FIG. 5.

The construction unit 32 proceeds to Step S13 when judges that it can construct the execution environment in which the APP can operate, but proceeds to Step S12 when judges that is cannot construct the execution environment in which the APP can operate.

At Step S12, the construction unit 32 outputs (or returns) information or the like that the construction unit 32 cannot cause the APP to operate because it cannot construct the execution environment in which the APP can operate, to the client apparatus or the like that has requested execution of the APP.

On the other hand, at Step S13, the construction unit 32 constructs the execution environment in which the APP operates, based on the Tag information read by the read unit 31 at Step S10.

FIG. 5 is a diagram for explaining processing by the APP provisioning engine.

The physical resources illustrated in FIG. 5 are a plurality of physical resources managed by the utility system. The utility system is managing the physical resources while virtualizing them. The APP provisioning engine 21 reads the Tag information, constructs an execution environment by combining the virtualized resources which are being virtualized and managed, based on the read Tag information, and executes an APP on the execution environment.

Hereinafter, the processing of the APP provisioning engine 21 will be described using a more concrete example. First of all, one example of APP will be described taking an attendance information management application as an example. The attendance information management application shall have functions of:

1. accepting input of the work start time and the work end time from each employee on working days; and
2. transmitting working information (information such as vacation, absence, overtime work, holiday work and so on) of each employee to a salary system at the end of month.

Further, the attendance information management application is composed of:

1. an application A that manages the working state of individual employee (an input interface for the employee to input);
2. an application B that batch-processes the working information in a month at the end of the month; and
3. an application C that manages the employee working information used in the application A and the application B.

Those applications shall operate on;

1. a server in which the architecture of IA-86 is installed;
2. LinuxOS Ver X, patch XX;
3. WebLogic application server Ver. X, patch XX; and
4. Oracle (trademark) 10G DB PSR XX.

Further, the application A shall be required to have nonstop availability 24 hours a day, 365 days a year, and the application B shall be required to be surely executed in 2 hours in processing at the end of every month.

Further, to maintain the service level of the application A, 4 CPUs, a 2 GB memory, and a 5 GB storage shall be required. Further, to maintain the service level of the application B, 10 CPUs, a 4 GB memory, and a 5 GB storage shall be required. Further, the application C shall require 2 CPUs and a 2 GB memory at the execution of the application A and require 16 CPUs and a 4 GB memory at the execution of the application B, and require the computing power to maintain the service levels of the respective applications and a specific area for a 300 GB storage in which an employee DB has been already constructed.

Further, the Tag information shall be stored according to the order illustrated in FIG. 6. FIG. 6 is a diagram illustrating an example of the Tag information. FIG. 7 is a diagram illustrating an example of the Tag information of the application A. FIG. 8 is a diagram illustrating an example of the Tag information of the application B. FIG. 9 is a diagram illustrating an example of the Tag information of the application C.

Figure 10:
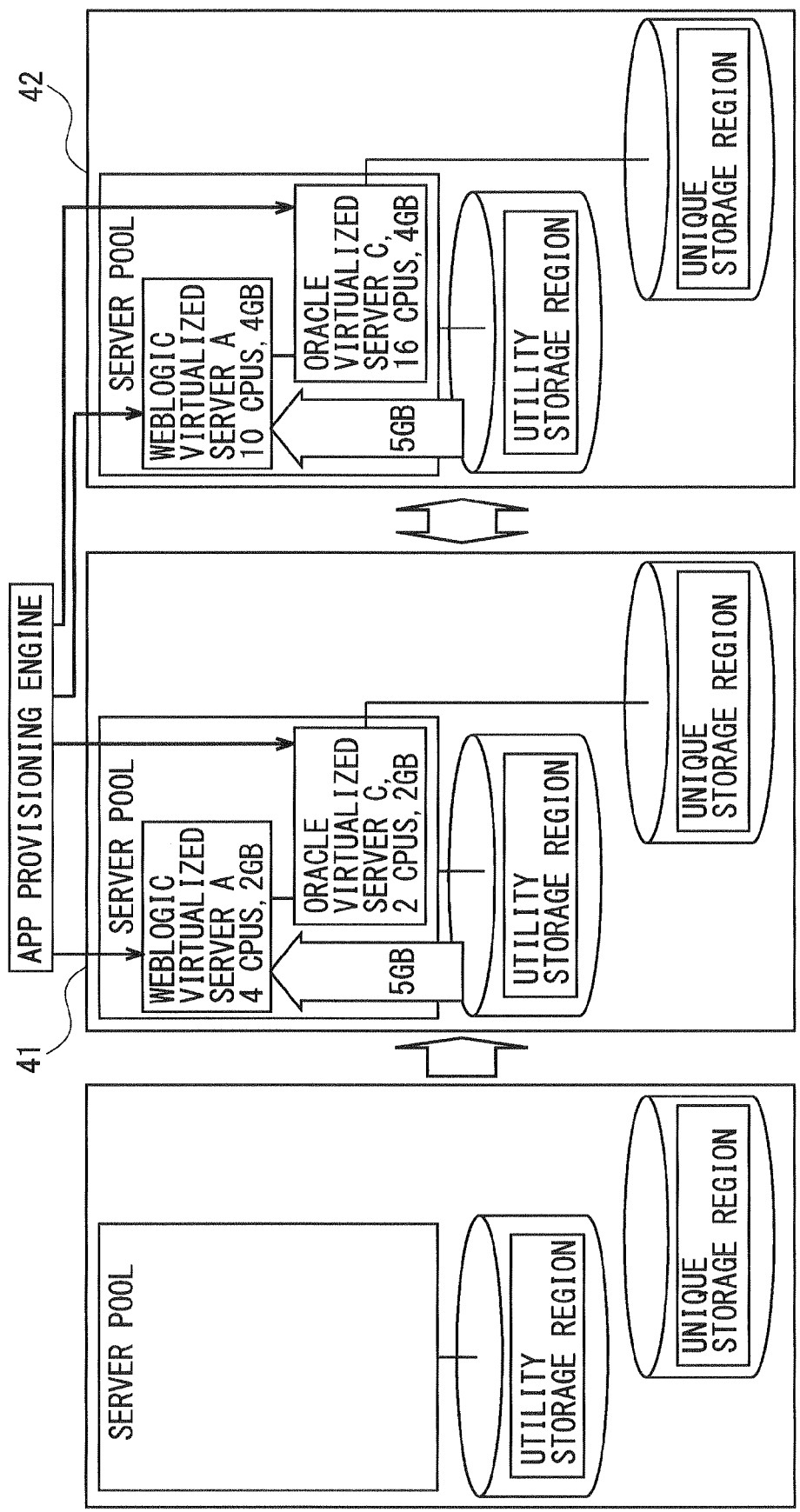
FIG. 10 is a diagram for explaining the construction of an execution environment in the APP provisioning engine.

Further, FIG. 10 is a diagram for explaining the construction of the execution environment in the APP provisioning engine. The APP provisioning engine 21 reads the Tag information of the application A, the Tag information of the application B, and the Tag information of the application C illustrated in FIG. 7, FIG. 8, and FIG. 9, and constructs the execution environments in which the respective applications operate as illustrated in FIG. 10, based on the respective pieces of Tag information.

To describe in more detail, the APP provisioning engine 21 reads the Tag information of the application A, the Tag information of the application B, and the Tag information of the application C illustrated in FIG. 7, FIG. 8, and FIG. 9, and constructs execution environments illustrated at numerals 41 and 42 in FIG. 10, based on the respective pieces of Tag information. The numeral 41 in FIG. 10 denotes an execution environment in which the application A operates, and the APP provisioning engine 21 secures 4 CPUs and so on from a server pool and also constructs an execution environment for the application C.

In this execution environment, the user can input the working state via the client apparatus 1 using the application A. Note that the numeral 42 in FIG. 10 denotes an execution environment in which the application B operates.

As described above, according to this embodiment, an APP can operate in the constructed execution environment, based on the Tag information, so that a technology assuring the quality relating to the operation of an APP even when the execution environment of the APP is different from the development environment of the APP can be provided.

-Second Embodiment-

In the first embodiment, the Tag information has been described as being stored in the specific position of an APP. The Tag information, however, may be stored separately from the APP such that the Tag information stored in a DB or the like in which the Tag information is associated with the APP.

In the case of the above-described configuration, the read unit 31 acquires the Tag information corresponding to the APP from the DB based on the APP identifier or the like, and reads the Tag information.

With the above-described configuration, the APP provisioning engine 21 can provide also to an already-existing APP a technology assuring the quality relating to the operation of the APP.

-Third Embodiment-

Further, the Tag information may be stored (written) in header information for each APP existing on a file system of the utility system.

In the case of the above-described configuration, the read unit 31 acquires the Tag information corresponding to the APP from the header information on the file system based on the APP identifier or the like, and reads the Tag information.

-Fourth Embodiment-

Further, as for the storage place of the Tag information, the above-described embodiments may be implemented in combination. In other words, the storage place for the Tag information is not limited to one of the above-described storage places but may be different, for example, depending on APP.

-Fifth Embodiment-

The information contained in the Tag information is not limited to those described in the above-described embodiments. This embodiment will be described taking a case in which basic information relating to accounting is contained in the Tag information, as an example.

The basic information relating to accounting here shall contain, for example, the charge per use time, the charge per the number of transactions, the charge per storage capacity, the charge per user identifier, the option information relating to accounting (the discount rates on the above-described units) and so on.

Figure 11:
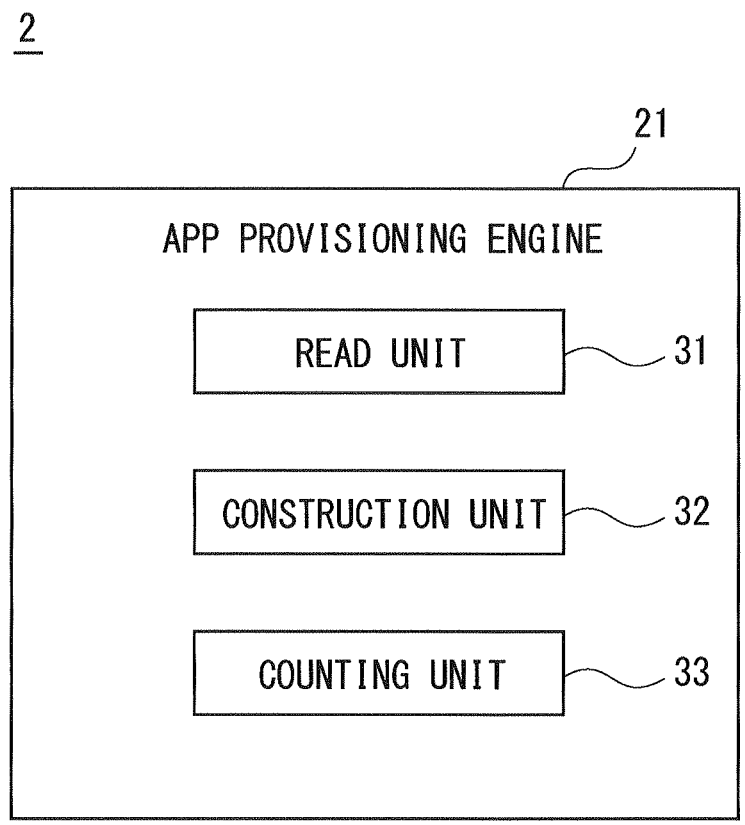
FIG. 11 is a diagram (II) illustrating an example of the functional configuration of the server apparatus.

FIG. 11 is a diagram (II) illustrating an example of the functional configuration of the server apparatus. As illustrated in FIG. 11, the server apparatus 2 includes, as the functional configuration, an APP provisioning engine 21 realized by the CPU 11 executing the program.

The APP provisioning engine 21 of this embodiment further includes a counting unit 33 in addition to the above-described functions of the first embodiment.

When an APP is executed, the counting unit 33 counts the accounting information accompanying the execution of the APP (that is, the charges accompanying the use of the APP) based on the basic information relating to accounting contained in the Tag information and the information relating to the execution of the APP. For example, when the charge per use time is contained as the information relating to accounting, the counting unit 33 counts the charge accompanying the use of the APP, based on the charge per use time and the information of the execution time of the APP.

Then, the counting unit 33 transmits the counted accounting information, for example, to a communicable accounting server or the like via the utility system and the network, and causes the accounting server or the like to store the accounting information.

Figure 12:
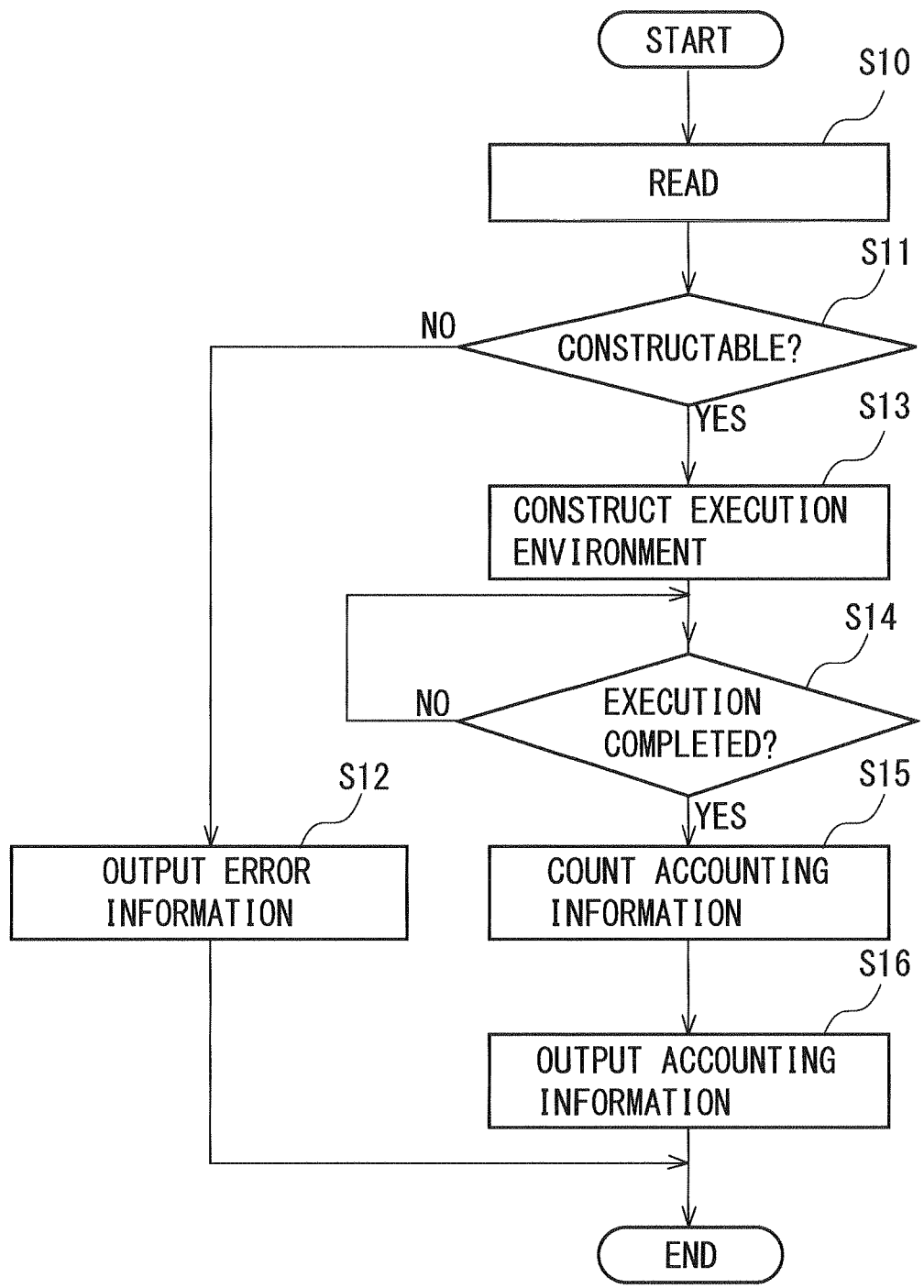
FIG. 12 is a flowchart (II) illustrating an example of processing of the APP provisioning engine.

FIG. 12 is a flowchart (II) illustrating an example of processing of the APP provisioning engine.

In the flowchart in FIG. 12, processing at Step S14 to Step S16 is newly added to that of the flowchart in FIG. 4.

At Step S14, the counting unit 33 judges whether the execution of the APP has been completed. The counting unit 33 proceeds to Step S15 when the execution of the APP has been completed, but repeats the processing at Step S14 when the execution of the APP has not been completed.

At Step S15, the counting unit 33 counts the accounting information accompanying the execution of the APP based on the basic information relating to accounting contained in the Tag information and the information relating to the execution of the APP.

At Step S16, the counting unit 33 outputs the accounting information counted at Step S15 to the accounting server or the like.

According to this embodiment, the quality relating to the operation of an APP can be assured and the processing of accounting accompanying the use of the APP can be quickly performed.

-Sixth Embodiment-

In the above-described embodiments, examples in which the Tag information contains the information required for a corresponding APP to operate with a certain quality (for example, the kind of CPU, the kind of OS, the patch information, the resource amount for maintaining the service level and so on) have been described. The Tag information, however, may contain prohibit information for an APP to operate with a certain quality (for example, description such as Linux Ver xx.x—NO or the like when Linux Ver xx.x is not allowable as the kind of OS for the APP to operate with a certain quality).

When the above-described prohibit information is contained in the Tag information read by the read unit 31, the construction unit 32 combines the fragmented virtualized resources not to include such a configuration, to thereby construct the execution environment in which the APP operates.

Not only the information of the operating environment minimally required for execution of the APP but also information of a plurality of operating environments in which the APP can be executed and performance information indicating processing performance that can be provided in each of the operating environments (response time, throughput and so on) may be described in a corresponding manner in the Tag information. In this case, the Tag information will contain, for example, description such as "in the operating environment-x (CPU-x, OS-x, patch-x), the response time is x(s) and the throughput is x (bps)".

This makes it possible that, for example, when a fast responsiveness is required, the user designates a necessary APP processing performance (for example, the response time, throughput, and so on). The construction unit 32 can construct an operating environment satisfying the response time and the throughput of the processing performance designated by the user, referring to the Tag information.

Furthermore, in the basic information relating to accounting contained in the Tag information, setting of the charge according to the processing performance to be used (for example, the use charge is set higher as the provided performance is higher) may be made. With this configuration, for example, when fast processing is not required, the user can select service at a low charge through its throughput is low, and the construction unit 32 can construct an operating environment that can provide the processing performance selected by the user, referring to the Tag information.

Here, an example of a mechanism that the user receives service provision will be described in more detail. The user first makes a contract for usage of APPs with a company providing service (hereinafter, referred to as a service company). The user can use not only one APP but a plurality of APPs, and use each of the APPs at a plurality of processing performances. Then, the service company registers the APPs available to each user and the processing performances for each of the APPs, into a server for managing user information.

FIG. 13 is a diagram illustrating a table storing available APPs for each user and selectable processing performances. In the example illustrated in FIG. 13, a user 001 can use an APP-x and an APP-y, and a user 002 can use only an APP-z. Further, when using the APP-x by the contract with the service company, the user 001 can select either a processing performance a (operation with a response time within 1 ms) or a processing performance b (operation with a response time within 1 s). The processing performance a and the processing performance b indicate, for example, the response time and the throughput that are minimally assured. In this case, setting of the charge according to the processing performance (namely, the charge is set higher as the processing performance is higher) will be made.

When using the service, the user 001 accesses an authentication server in the service company from a terminal device, and transmits a login request. The authentication server accepts the loin request from the user 001. After completion of authentication, the authentication server acquires the information of the user 001 from the server for managing the user information, and transmits information for a menu screen of the user 001 to the terminal device. Then, the terminal device of the user 001 presents on the menu screen a massage confirming with the user which one of the APP-x and the APP-y the user will use. Once the user 001 selects the APP-x, the terminal device presents on the menu screen a message confirming which one of the processing performance a and the processing performance b that the user will use the APP-x with. Once the user 001 selects the processing performance a, the terminal device requests the use of the APP-x with the processing performance a to the server apparatus 2. Then, in the server apparatus 2, the construction unit 32 of the APP provisioning engine 21 retrieves information of an operating environment for the APP-x satisfying the processing performance a referring to the Tag information of the APP-x, and constructs the operating environment for the APP-x based on the corresponding information of the operating environment.

Hereinafter, processing when the construction unit 32 constructs the operating environment satisfying the processing performance a referring to the Tag information will be described in more detail. FIGS. 14A and 14B are diagrams each illustrating the Tag information in which the performance information of the APP-x and the operating environment are written in a corresponding manner. FIG. 14A is a diagram illustrating Tag information 1 in which the operating environment assuring a response time of 0.5 ms is written, and FIG. 14b is a diagram illustrating Tag information 2 in which the operating environment assuring a response time of 0.5 s is written. The Tag information 1 indicates that the operating environment assuring the response time within 0.5 ms is constructed by CPU-1, Os-1, and DB-1, and the Tag information 2 indicates that the operating environment assuring the response time within 0.5 s is constructed by CPU-2, OS-2, and DB-2. Note that the Tag information 1 and the Tag information 2 of the APP-x illustrated in FIGS. 14A and 14B may have configurations managed as individual pieces of Tag information, or may have configurations managed as being contained in one piece of Tag information for each APP.

Upon request of use of the APP-x with the processing performance a (the response time within 1 ms) from the terminal device of the user, the construction unit 32 refers to the Tag information 1 and the Tag information 2 illustrated in FIGS. 14A and 14B and judges whether or not the operating environments of the respective pieces of Tag information satisfy the required processing performance a (namely, the response time within 1 ms). In the examples illustrated in FIGS. 14A and 14B, the operating environment assuring the response time within 0.5 ms is written in the Tag information 1, and therefore the construction unit 32 judges that the operating environment of the Tag information 1 satisfies the processing performance a (the response time within 1 ms). On the other hand, the operating environment assuring the response time within 0.5 s is written in the Tag information 2, and the construction unit 32 judges that the operating environment of the Tag information 2 does not satisfy the processing performance a (the response time within 1 ms). Accordingly, in this case, the construction unit 32 constructs the operating environment composed of CPU-1, OS-1, and DB-1, using the Tag information 1. Note that in the case where there are a plurality of pieces of Tag information satisfying the processing performance a, a priority order is set for the pieces of Tag information in advance, whereby the construction unit 32 can select one of the pieces of Tag information based on the set priority order to construct the operating environment.

Further, the examples illustrated in FIGS. 14A and 14B include accounting information for each user identifier and processing performance as the Tag information. It is indicated that accounting is made at 1000 yen/hour in the case of the operating environment of the Tag information 1. Then, the counting unit 33 counts the use charge at 1000 yen/hour when the APP is used with the processing performance a.

This makes it possible for the user to select a processing performance of an APP according to the situation. Accordingly, the user can use the APP with a high processing performance when requiring fast responsiveness, where as the user can use the APP with a low processing performance when not necessarily requiring fast responsiveness to thereby save the charge, resulting in improved convenience.

Note that the example illustrated in FIG. 13 has a configuration in which the user selects an available processing performance from the menu screen. The configuration may be made such that the user does not make a contract in advance for the processing performance, but directly inputs a necessary processing performance every use, and the use charge per unit time in the operating environment satisfying the inputted processing performance is estimated by the server apparatus 2 based on the Tag information, and the user starts the use thereof after checking the estimation result (or changing with another processing performance). Further, the user will select a processing performance in the example illustrated in FIG. 13, but the configuration may be made such that when a plurality of pieces of SLA information (for example, operating 24 hours a day, 365 days a year and so on) are set in the Tag information of the APP, the user can select an SLA at login. Further, the server for login and the server for managing the user information may have, but not limited to, a configuration in which the servers are provided as independent server apparatuses or a configuration in which the servers are integrally provided as functions of the server apparatus 2.

Also according to this embodiment, a technology assuring the quality relating to the operation of an APP can be provided.

-Seventh Embodiment-

The above-described embodiments have been described taking, as an example, the system in which the client apparatus 1 and the utility system (or the utility system and the cloud system and so on) are communicably connected via the network. A system of this embodiment, however, shall include only the client apparatus 1. More specifically, this embodiment is an example in which, as described above, the client apparatus that is the side requesting use of an APP and the server apparatus that is the side providing the function of the APP are realized in the form in which the client apparatus and the server apparatus are installed in one apparatus.

FIG. 15 is a diagram illustrating an example of a hardware configuration of the client apparatus. As illustrated in FIG. 15, the client apparatus 1 includes a CPU 51 as a hardware configuration.

The CPU 51 performs processing based on programs (for example, an APP provisioning engine program) stored in a storage device 53, to thereby realize the function of the client apparatus 1 (the above-described function of the APP provisioning engine 21 in FIG. 3) or the processing relating to the flowchart in FIG. 4.

Further, to the CPU 51, an input device 52, a storage device 53, and a display device 54 are connected via a bus. The storage device 53 is composed of, for example, a ROM, a RAM, a hard disk device and so on and stores the above-described programs and data used in the processing based on the programs. The display device 54 is, for example, a display or the like displaying information. The input device 52 is, for example, an operation key or the like for inputting information.

As described above, the APP provisioning engine 21 of this embodiment has the function similar to that illustrated in the first embodiment. The APP provisioning engine 21, when mounted on the client apparatus 1 as in this embodiment, constructs an execution environment required for causing the APP installed in the client apparatus 1 to operate. For example, when a plurality of APPs are executed by the client apparatus 1 and there is a request to cause the plurality of APPs to operate, the APP provisioning engine 21 reads Tag information corresponding to each of the APPs and constructs an execution environment required for causing each of the APPs to operate, using the physical resources in the client apparatus 1. Then, when the APP provisioning engine 21 could not construct the execution environment required for causing an APP to operate, the APP provisioning engine 21 outputs, to the display device 54 or the like, information that the APP provisioning engine 21 cannot cause the APP to operate because the APP provisioning engine 21 cannot construct the execution environment in which the APP can operate.

According to this embodiment, the quality relating to the operation of an APP operating in a single apparatus can also be assured.

Preferred embodiments of the present invention have been described in detail, and the present invention is not limited to those specific embodiments but can be variously changed and modified within a scope of the present invention set forth in claims.

Further, the above-described embodiments may be arbitrarily combined.

According to the present invention, a technology assuring the operation quality of an APP and the quality relating to the service level containing the response time can be provided.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An information processing apparatus having a processor, the apparatus comprising:
a read unit reading operation information corresponding to an application according to an execution request and relating to an operation of the application; and
a construction unit constructing, via the processor, an execution environment in which the application operates, based on the operation information read by said read unit,
wherein said construction unit judges whether the execution environment can be constructed, based on the operation information and virtualized resources available of fragmented virtualized resources, and constructs the execution environment by combining the available fragmented virtualized resources when said construction unit judges that the execution environment can be constructed,
wherein basic information relating to accounting accompanying execution of the application is contained in the operation information, and
wherein said information processing apparatus further comprises a counting unit counting, when the application is executed, accounting information accompanying the execution of the application based on the information relating to the basic information and information relating to the execution.

2. The information processing apparatus according to claim 1, wherein when said construction unit was not able to construct the execution environment in which the application operates based on the operation information read by said read unit, said construction unit outputs information that said construction unit is not able to cause the application to operate.

3. The information processing apparatus according to claim 1, wherein performance information indicating performance for each operating environment for the application is contained in the operation information, and
wherein said construction unit constructs the execution environment in which the application operates, based on the performance information contained in the operation information read by said read unit.

4. The information processing apparatus according to claim 1, wherein the operation information is added to the application, and
wherein said read unit reads the operation information added to the application.

5. The information processing apparatus according to claim 1, wherein the operation information is stored in a storage device in which the operation information is associated with the application, and
wherein said read unit reads, from said storage device, the operation information associated with the application.

6. The information processing apparatus according to claim 1, wherein the operation information is contained in header information for each application on a file system, and
wherein said read unit reads the operation information of the application from the header information.

7. A computer-assisted information processing method, the computer comprising a processor, the method comprising:
a read step of an information processing apparatus reading operation information corresponding to an application according to an execution request and relating to an operation of the application; and
a construction step of said information processing apparatus constructing, via the processor, an execution environment in which the application operates, based on the operation information read in said read step,
wherein said construction step judges whether the execution environment can be constructed, based on the operation information and virtualized resources available of fragmented virtualized resources, and constructs the execution environment by combining the available fragmented virtualized resources when said construction step judges that the execution environment can be constructed,
wherein basic information relating to accounting accompanying execution of the application is contained in the operation information, and
wherein said computer-assisted information processing method further comprises a counting step of said information processing apparatus counting, when the application is executed, accounting information accompanying the execution of the application based on the information relating to the basic information and information relating to the execution.

8. A computer program product comprising a non-transitory computer usable medium having control logic stored therein for causing the computer to process information, the control logic comprising:
computer readable program code means for reading operation information corresponding to an application according to an execution request and relating to an operation of the application; and computer readable program code means for constructing an execution environment in which the application operates, based on the operation information read by said means for reading operation information, wherein said means for constructing an execution environment judges whether the execution environment can be constructed, based on the operation information and virtualized resources available of fragmented virtualized resources, and constructs the execution environment by combining the available fragmented virtualized resources when said means for constructing an execution environment judges that the execution environment can be constructed, wherein basic information relating to accounting accompanying execution of the application is contained in the operation information, and wherein said control logic further comprises computer readable program code means for counting, when the application is executed, accounting information accompanying the execution of the application based on the information relating to the basic information and information relating to the execution.

* * * * *